United States Patent
Quan et al.

(10) Patent No.: US 12,297,850 B2
(45) Date of Patent: May 13, 2025

(54) VELOCITY AND POSITION COMPOUND CONTROL SYSTEM FOR PUMP-VALVE DUAL-SOURCE DRIVEN HYDRAULIC CYLINDER

(71) Applicant: Taiyuan University of Technology, Jinzhong (CN)

(72) Inventors: Long Quan, Jinzhong (CN); Tao Liang, Jinzhong (CN); Lianpeng Xia, Jinzhong (CN); Xiangyu Wang, Jinzhong (CN); Weinan Huang, Jinzhong (CN)

(73) Assignee: Taiyuan University of Technology, Jinzhong (CN)

( * ) Notice: Subject to any disclaimer, the term of this patent is extended or adjusted under 35 U.S.C. 154(b) by 0 days.

(21) Appl. No.: 18/532,204

(22) Filed: Dec. 7, 2023

(65) Prior Publication Data
US 2024/0200581 A1 Jun. 20, 2024

(30) Foreign Application Priority Data
Dec. 7, 2022 (CN) ......................... 202211567275.4

(51) Int. Cl.
*F15B 21/08* (2006.01)
*F15B 11/17* (2006.01)
(Continued)

(52) U.S. Cl.
CPC ............ *F15B 21/087* (2013.01); *F15B 11/17* (2013.01); *F15B 13/02* (2013.01);
(Continued)

(58) Field of Classification Search
CPC .......... F15B 21/087; F15B 2211/20515; F15B 2211/20546; F15B 2211/20561; F15B 2211/20576; F15B 2211/633
See application file for complete search history.

(56) References Cited

U.S. PATENT DOCUMENTS

| | | | |
|---|---|---|---|
| 6,962,050 B2 * | 11/2005 | Hiraki ..................... | F15B 11/17 60/486 |
| 12,000,504 B1 * | 6/2024 | Quan .................. | F15B 13/0402 |

(Continued)

FOREIGN PATENT DOCUMENTS

| | | | | |
|---|---|---|---|---|
| CN | 106523462 A | * | 3/2017 | ............. F15B 15/14 |
| CN | 113775604 A | * | 12/2021 | |

*Primary Examiner* — Thomas E Lazo
(74) *Attorney, Agent, or Firm* — Fish IP Law, LLP

(57) ABSTRACT

The present disclosure belongs to the technical field of hydraulic control, and relates to a velocity and position compound control system for a pump-valve dual-source driven hydraulic cylinder used in engineering machinery. The system includes a first power source, a first hydraulic pump, a second power source, a second hydraulic pump, a safety valve, a proportional directional valve, a pilot operated check valve, a single-rod hydraulic cylinder, a handle, a tank, a rotating speed sensor, a first pressure sensor, a second pressure sensor, a third pressure sensor, a temperature sensor, a position transmitting unit, magnetic induction marks, a count correction module, an integrator module, a calculation control module, a signal acquisition module, a data storage module, a cloud memory, a communication protocol module, a fault diagnosis module, and a process monitoring module.

7 Claims, 3 Drawing Sheets

(51) Int. Cl.
*F15B 13/02* (2006.01)
*F15B 15/14* (2006.01)
*F15B 19/00* (2006.01)

(52) U.S. Cl.
CPC ........ *F15B 15/1457* (2013.01); *F15B 19/005* (2013.01); *F15B 2211/20515* (2013.01); *F15B 2211/20546* (2013.01); *F15B 2211/20561* (2013.01); *F15B 2211/3144* (2013.01)

(56) References Cited

U.S. PATENT DOCUMENTS

| | | | | |
|---|---|---|---|---|
| 2016/0102685 | A1* | 4/2016 | Chester | F15B 11/003 60/434 |
| 2017/0298590 | A1* | 10/2017 | Hijikata | F15B 11/165 |
| 2020/0362889 | A1* | 11/2020 | Hodel | G06N 3/084 |
| 2021/0048043 | A1* | 2/2021 | Kondo | F15B 11/08 |
| 2021/0372078 | A1* | 12/2021 | Kim | F15B 21/14 |

* cited by examiner

VELOCITY AND POSITION COMPOUND CONTROL SYSTEM FOR PUMP-VALVE DUAL-SOURCE DRIVEN HYDRAULIC CYLINDER

CROSS REFERENCE TO RELATED APPLICATION

This patent application claims the benefit and priority of Chinese Patent Application No. 202211567275.4, filed with the China National Intellectual Property Administration on Dec. 7, 2022, the disclosure of which is incorporated by reference herein in its entirety as part of the present application.

TECHNICAL FIELD

The present disclosure belongs to the technical field of hydraulic control, and relates to a velocity and position compound control system for a pump-valve dual-source driven hydraulic cylinder used in engineering machinery.

BACKGROUND

In engineering machinery, a hydraulic system is generally used to drive the action of working devices, and a driver operates a handle to control the operation of hydraulic actuators through open-loop control. Due to the harsh working conditions of engineering machinery, the external load force changes drastically in a wide range. Therefore, under the impact of system leakage and oil compressibility, it is difficult for hydraulic actuators to operate at a desired velocity and displacement. An external velocity-displacement sensor is usually mounted on the hydraulic cylinder, which can achieve high-precision control of the hydraulic cylinder through a closed loop of velocity and position. In the published invention patent CN201611252976.3, a high-precision displacement control hydraulic cylinder system and control method thereof is proposed, in which two external displacement sensors are used to improve displacement control precision. However, the external displacement sensors are easily contaminated by oil stains, solutions, and dust and exhibit poor reliability, increasing the complexity of system maintenance. The integrated displacement sensor inside the hydraulic cylinder can effectively avoid the impact of harsh environments, but processing difficulty and costs of the hydraulic cylinder are significantly increased. In addition, the use of sensors that continuously collect the velocity and displacement of the hydraulic cylinder results in high costs, which is not suitable for the engineering machinery field with low control precision requirements and strict cost limitations.

In addition, the existing engineering machinery hydraulic system features a low degree of intelligence, without a self-learning and adaptive capability to respond to variable load, environment, and changes in the system. Moreover, fault diagnosis and service life prediction cannot be performed, and all repairs are performed after accidents, resulting in safety accidents and economic losses. Furthermore, historical fusion data cannot be used for analysis, calculation, comparison, and decision-making, causing a serious waste of energy.

To further improve the prior art, the present disclosure proposes a velocity and displacement detection and control method suitable for hydraulic cylinders in engineering machinery. Additionally, the operation data of the system in a full life cycle can be grasped.

SUMMARY

The present disclosure proposes a velocity and position integrated control system and method for a pump-valve dual-source driven hydraulic cylinder, which can achieve velocity and displacement detection and control, and further feature a fault diagnosis function.

To achieve the foregoing objective, the present disclosure adopts the following technical solutions:

A velocity and position compound control system for a pump-valve dual-source driven hydraulic cylinder includes: a first power source, a first hydraulic pump, a second power source, a second hydraulic pump, a safety valve, a proportional directional valve, a pilot operated check valve, a single-rod hydraulic cylinder, a handle, a tank, a velocity sensor, a first pressure sensor, a second pressure sensor, a third pressure sensor, a temperature sensor, a position transmitting unit, magnetic induction marks, a count correction module, an integrator module, a calculation control module, a signal acquisition module, a data storage module, a cloud memory, a communication protocol module, a fault diagnosis module, and a process monitoring module, where a P port of the proportional directional valve is connected to the first pressure sensor, the temperature sensor, and an outlet port of the first hydraulic pump; an A port of the proportional directional valve is connected to a rodless chamber of the single-rod hydraulic cylinder and the second pressure sensor; a B port of the proportional directional valve is connected to a rod chamber of the single-rod hydraulic cylinder and the third pressure sensor; the inlet and outlet ports of the pilot operated check valve are connected to a R port of the proportional directional valve and the tank, respectively; and the inlet and outlet ports of the second hydraulic pump are connected to the rodless chamber and the rod chamber of the single-rod hydraulic cylinder, respectively, and the second power source is provided with the rotating speed sensor; and the signal acquisition module receives a rotating speed $n_2$ of the second power source, an oil temperature T, an outlet pressure $p_s$ of the first hydraulic pump, a rodless-chamber pressure $p_A$ of the single-rod hydraulic cylinder, a rod-chamber pressure $p_B$ of the single-rod hydraulic cylinder, and an output signal u of the handle, and an output port of the signal acquisition module is connected to the calculation control module and the data storage module; an output port of the calculation control module is connected to the integrator module and the data storage module, and transmits the control signals to the second power source, the proportional directional valve, the pilot operated check valve, and the first hydraulic pump; an output port of the integrator module is connected to the count correction module and the data storage module; the count correction module receives an output signal of the position transmitting unit, and an output signal of the count correction module is connected to the calculation control module; the data storage module is connected to the communication protocol module, the fault diagnosis module, and the process monitoring module; and the communication protocol module is connected to the cloud memory.

In the velocity and position compound control system for a pump-valve dual-source driven hydraulic cylinder, magnetic induction marks with known spacing are processed in an axial direction of a piston rod of the single-rod hydraulic cylinder as position monitoring points, where the magnetic induction marks are equidistantly arranged or non-equidistantly arranged.

In the velocity and position compound control system for a pump-valve dual-source driven hydraulic cylinder, the position transmitting unit is mounted on the end portion of the single-rod hydraulic cylinder, and the position transmitting unit is a magnetoresistive sensor, a hall sensor, or an eddy current sensor.

In the velocity and position compound control system for a pump-valve dual-source driven hydraulic cylinder, the calculation control module outputs the following parameters according to the signal processing module:

total input power: $P_s=Q_B(p_A-p_B)+Q_v P_s$, useful power: $P_{CY}=p_A Q_A-p_B Q_B$, and a power loss: $P_{LS}=Q_v \Delta p_v$;

where $Q_A$ represents the flow rate of the rodloss chamber of the hydraulic cylinder, $Q_B$ represents the flow rate of the rod chamber of the hydraulic cylinder, $Q_v$ represents the flow rate of the proportional directional valve, $p_s$ represents the outlet pressure of the first hydraulic pump, and $\Delta p_v=p_A-p_B$.

In the velocity and position compound control system for a pump-valve dual-source driven hydraulic cylinder, the integrator module outputs the following parameters:

a theoretical position of the hydraulic cylinder:

$$x_t = x_0 + \int_0^t v_t dt,$$

total input energy:

$$E_s = \int_0^t P_s dt,$$

useful energy:

$$E_{CY} = \int_0^t P_{CY} dt,$$

throttling loss:

$$E_{LS} = \int_0^t P_{LS} dt,$$

and system efficiency: $\eta=E_{CY}/E_s$;

where $x_0$ is an initial position, and $v_t$ is a set velocity of the hydraulic cylinder.

In the velocity and position compound control system for a pump-valve dual-source driven hydraulic cylinder, one pulse is sent to the count correction module each time the magnetic induction mark passes through the position transmitting unit; and if a total number of passes is k, an actual position $x_a$ of the hydraulic cylinder is determined according to a formula $x_a=k\lambda+x_0$, a position deviation is calculated as $\Delta x=x_t-x_a$, a distance between two position detection points is $\lambda$, a velocity correction coefficient $\gamma$ is calculated according to a formula $\gamma=\Delta x/\lambda+1$, and $\gamma$ is transmitted to the calculation control module.

In the velocity and position compound control system for a pump-valve dual-source driven hydraulic cylinder, the data storage module is configured to store operation data of a hydraulic cylinder drive system in a full life cycle;

the process monitoring module displays a dynamic curve of a parameter in the data storage module;

the communication protocol module is the Ethernet, an industrial Internet, or Bluetooth, transmits data from the data storage module to the cloud memory, and receives data information stored in the cloud memory; and the fault diagnosis module performs fault analysis and proactive maintenance on a hydraulic system according to a system parameter received by the data storage module.

Compared with the prior art, the present disclosure has the following beneficial effects:

1. In the present disclosure patent, the second power source drives the second hydraulic pump to control the operating velocity and displacement of the hydraulic cylinder, and a valve group unit is used to compensate for an asymmetric flow of the single-rod hydraulic cylinder. The system pressures and the oil temperature are collected to compensate for the leakage of a theoretical output flow and oil compressibility of the second hydraulic pump, and the flow can be detected and controlled with high precision without a flow sensor. This present disclosure resolves the problem that the existing flow sensor cannot control a flow in a closed-loop, is high in costs and complex to mount, and has large pressure losses.

2. In the present disclosure, the operating velocity and displacement of the hydraulic cylinder are estimated from the flow of the second hydraulic pump. After correction through the integrator module and the correction step, the velocity and position of the hydraulic cylinder can be controlled at low costs and with high reliability without the need for an expensive high-precision displacement sensor.

3. In the present disclosure, the pressure, flow, power, energy, and other information during the operation of the system are collected in real time. Through an intelligent algorithm, the operating and health statuses of a key component can be analyzed and controlled in a full life cycle, and fault prediction can be achieved, making the entire hydraulic system intelligent. This is a function that the conventional hydraulic system does not have.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

In the figures: 1—first power source, 2—first hydraulic pump, 3—relief valve, 4—first pressure sensor, 5—temperature sensor, 6—pilot operated check valve, 7—proportional directional valve, 8—second power source, 9—second pressure sensor, 10—second hydraulic pump, 11—third pressure sensor, 12—single-rod hydraulic cylinder, 13—count correction module, 14—integrator module, 15—calculation control module, 16—signal acquisition module, 17—data storage module, 18—communication protocol module, 19—fault diagnosis module, 20—process monitoring module, 21—handle, 22—cloud memory, 23—rotating speed sensor; 12-1—position transmitting unit, 12-2—magnetic induction mark, 12-3—piston rod.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

Meanings of the parameters in this specification are as follows:

$A_A$—rodloss-chamber area of hydraulic cylinder, $A_B$—rod-chamber area of hydraulic cylinder, $Q_A$—rodloss-chamber flow of hydraulic cylinder, $Q_B$—rod-chamber flow of hydraulic cylinder, v—velocity of hydraulic cylinder, α—ratio of areas of two chambers of hydraulic cylinder, $p_s$—outlet pressure of first hydraulic pump, $p_A$—rodloss-chamber pressure of hydraulic cylinder, $p_B$—rod-chamber pressure of hydraulic cylinder, $x_t$—theoretical position of hydraulic cylinder, $x_0$—initial position of hydraulic cylinder, λ—distance between two adjacent magnetic induction marks, $x_a$—actual position of hydraulic cylinder, k—number of pulses, Δx—position deviation, $P_s$—input power, $P_{CY}$—useful power, $P_{LS}$—power loss, $E_s$—input energy, $E_{CY}$—useful energy, $E_{LS}$—throttling loss, η—system efficiency, γ—correction coefficient, $V_1$—displacement of first hydraulic pump, $n_1$—rotating speed of first power source, $V_2$—displacement of second hydraulic pump, $n_2$—rotating speed of second power source, T—oil temperature, $C_d$—flow coefficient of proportional directional valve, w—area gradient of proportional directional valve, $x_v$—control signal of proportional directional valve, $Q_v$—flow of proportional directional valve, ρ—hydraulic oil density, $\Delta p_v$—pressure difference of proportional directional valve.

In order to make the above objective, features and advantages of the present disclosure clearer and more comprehensible, the present disclosure will be further described in detail below in combination with accompanying drawings and particular implementations.

Figure 1:
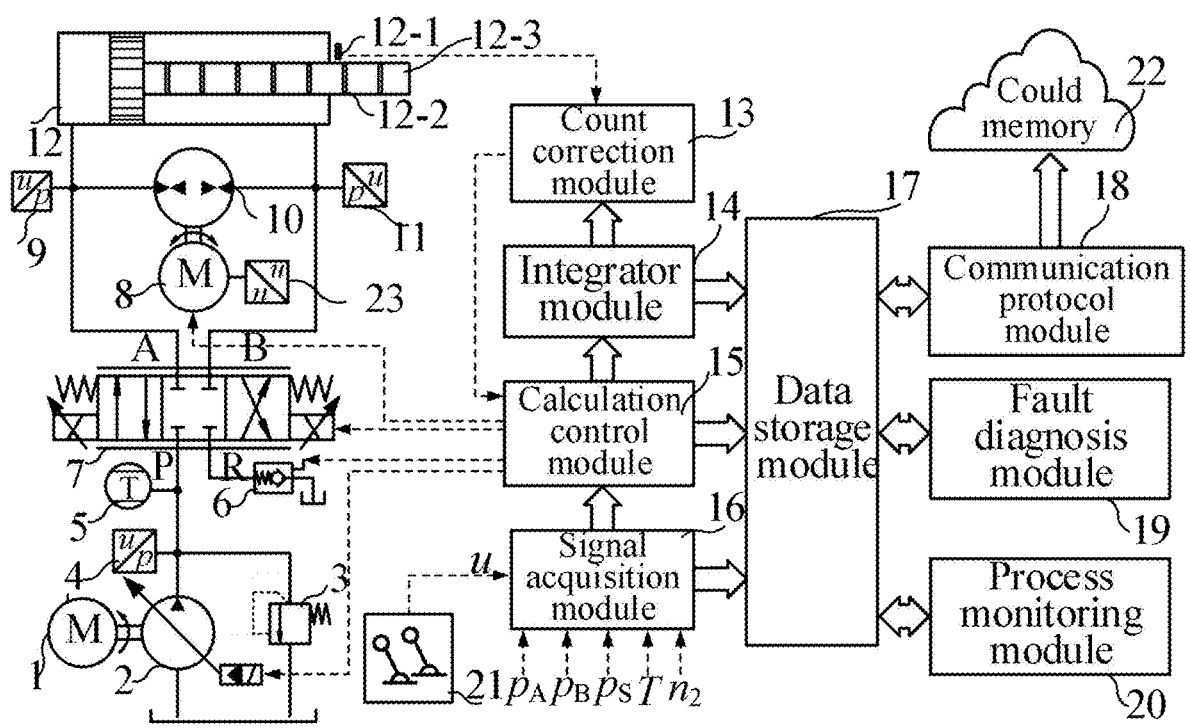
FIG. 1 is a schematic diagram of a velocity and position compound control system for a pump-valve dual-source driven hydraulic cylinder according to the present disclosure.

As shown in FIG. 1, a velocity and position compound control system for a pump-valve dual-source driven hydraulic cylinder includes a second power source 8, a second hydraulic pump 10, a safety valve 3, a proportional directional valve 7, a pilot operated check valve 6, a single-rod hydraulic cylinder 12. The second power source 8 drives the second hydraulic pump 10 to control the operating velocity and displacement of the single-rod hydraulic cylinder 12. The rotating speed sensor 23 detects a rotating speed of the second power source 8. A first power source 1 drives a first hydraulic pump 2 to output a flow to pass through the proportional directional valve 7, to compensate for an asymmetric flow required by the single-rod hydraulic cylinder 12.

This system is further provided with a first pressure sensor 4, a second pressure sensor 9, a third pressure sensor 11, a temperature sensor 5, a position transmitting unit 12-1, a count correction module 13, an integrator module 14, a calculation control module 15, a signal acquisition module 16, a data storage module 17, a cloud memory 22, a communication protocol module 18, a fault diagnosis module 19, and a process monitoring module 20.

A P port of the proportional directional valve 7 is connected to the first pressure sensor 4 and an outlet port of the first hydraulic pump 2. An A port of the proportional directional valve 7 is connected to a rodless chamber of the single-rod hydraulic cylinder 12 and the second pressure sensor 9. A B port of the proportional directional valve 7 is connected to a rod chamber of the single-rod hydraulic cylinder 12 and the third pressure sensor 11. The oil and outlet ports of the pilot operated check valve 6 are connected to an outlet port R of the proportional directional valve 7 and the tank, respectively. The inlet and outlet ports of the second hydraulic pump 10 are connected to the rodless chamber and the rod chamber of the single-rod hydraulic cylinder 12, respectively. The signal acquisition module 16 receives a rotating speed $n_2$ of the second power source 8, a temperature signal T of the temperature sensor 5, an outlet pressure $p_s$ of the first hydraulic pump 2, a rodless-chamber pressure $p_a$ of the single-rod hydraulic cylinder 12, a rod-chamber pressure $p_B$ of the single-rod hydraulic cylinder 12, and an output signal u of a handle 21, and an output port of the signal acquisition module 16 is connected to the calculation control module 15 and the data storage module 17. An output port of the calculation control module 15 is connected to the integrator module 14 and the data storage module 17, and transmits a control signal to the second power source 8, the proportional directional valve 7, the pilot operated check valve 6, and the first hydraulic pump 2. An output port of the integrator module 14 is connected to the count correction module 13 and the data storage module 17. The count correction module 13 receives an output signal of the position transmitting unit 12-1, and an output signal of the count correction module 13 is connected to the calculation control module 15. The data storage module 17 is connected to the communication protocol module 18, the fault diagnosis module 19, and the process monitoring module 20. The communication protocol module 18 is connected to the cloud memory 22.

Figure 2:
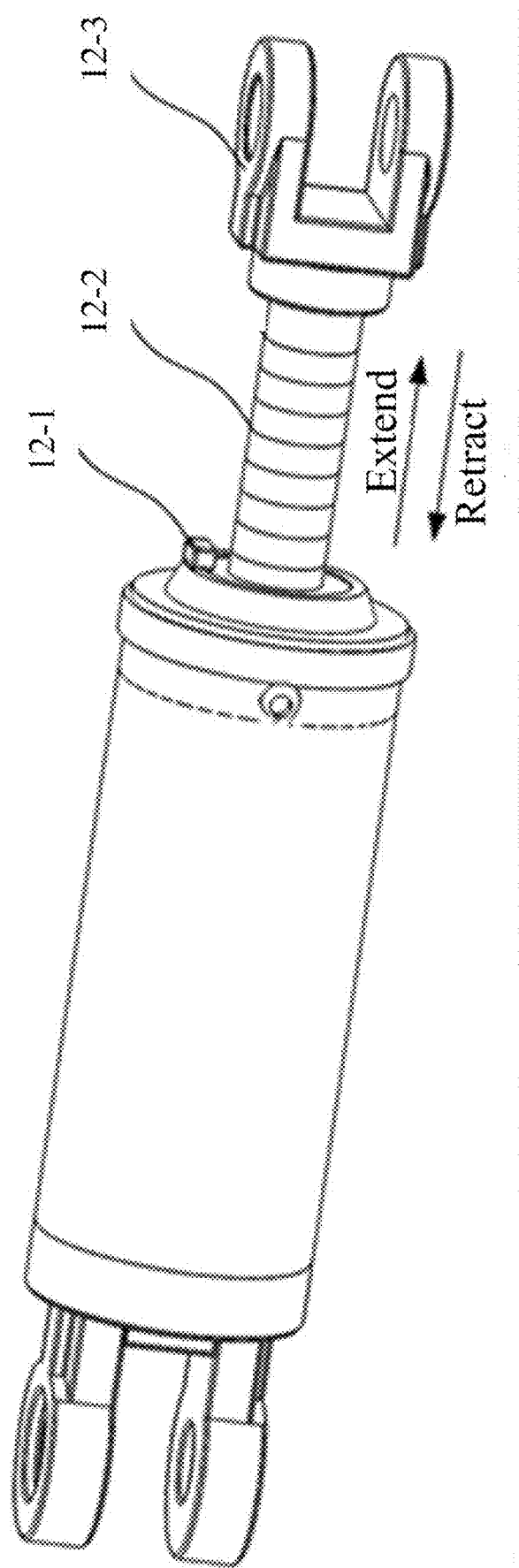
FIG. 2 is a structural diagram of a single-rod hydraulic cylinder according to the present disclosure.

As shown in FIG. 2, before assembly of the single-rod hydraulic cylinder 12, a CNC machine tool is used to cut grooves in a piston rod 12-3, and one annular groove is processed at intervals λ of 50 mm, with an annular groove at a fully retracted state of the piston rod as a zero-point position reference. The annular grooves are filled with magnetic material to become magnetic induction marks, and the surface roughness of the piston rod 12-3 is uniformly processed. In addition, the position transmitting unit 12-1 is further mounted on an end portion of a cylinder body of the hydraulic cylinder, for sensing the magnetic induction marks. The position transmitting unit is a magnetoresistive sensor, a hall sensor, or an eddy current sensor.

Figure 3:
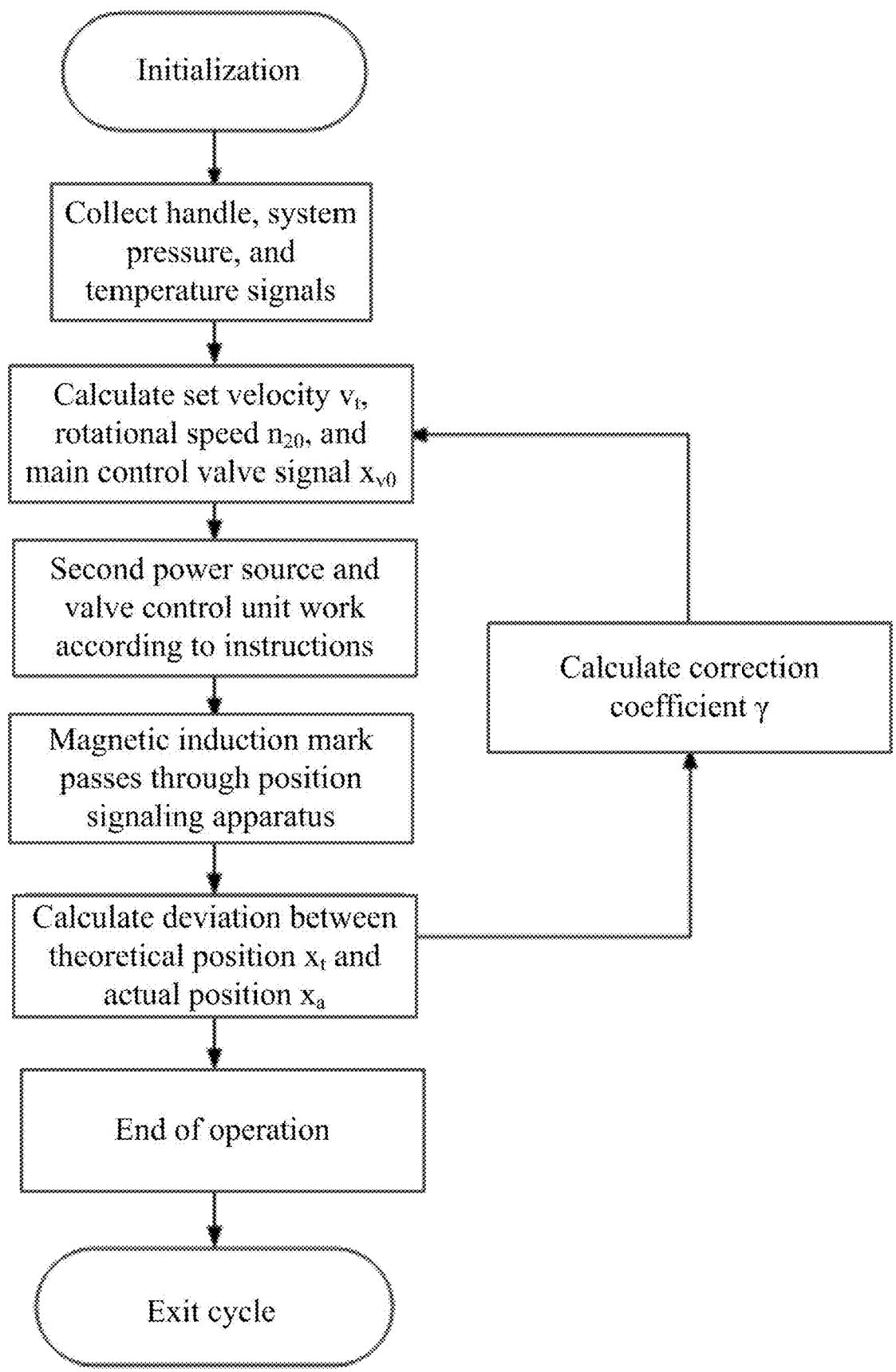
FIG. 3 is a flowchart of a control method according to the present disclosure.

In this embodiment, the working principle of the velocity and position compound control system for the hydraulic cylinder is shown in FIG. 3, and steps are as follows:

In step 1, the system is powered and initialized, and the calculation control module 15 reads a position of the single-rod hydraulic cylinder 12 at the end of the last operation from the data storage module 17, as an initial position $x_0$ of the current operation of the single-rod hydraulic cylinder 12.

In step 2, the output signal of the handle 21 is received by the signal acquisition module 16, and processed by the calculation control module 15 and converted into a set velocity $v_t$ of the single-rod hydraulic cylinder 12, to obtain a rotating speed control signal $n_{20}$ of the second power source 8, where $n_{20}=v_t \cdot A_B/V_2$. When the single-rod hydraulic cylinder 12 extends, the proportional directional valve 7 works in the left position, a displacement setting signal $x_{v0}$ of the proportional directional valve 7 is determined according to $$x_v = \frac{Q_v}{C_d w} \sqrt{\frac{\rho}{2(p_s - p_A)}},$$

and the proportional directional valve 7 compensates for an asymmetric flow of the single-rod hydraulic cylinder 12 and controls the pilot operated check valve 6 to be turned off to prevent oil in the rod chamber from returning to the tank. When the single-rod hydraulic cylinder 12 retracts, the proportional directional valve 7 works in the left position, the control valve displacement setting signal $x_{v0}$ is determined according to $$x_v = \frac{Q_v}{C_d w} \sqrt{\frac{\rho}{2p_A}},$$

and the pilot operated check valve 6 is controlled to be opened, to cause excess oil from the rodless chamber of the single-rod hydraulic cylinder 12 to return to the tank.

In step 3, the set velocity $v_t$ of the single-rod hydraulic cylinder 12 is input into the integrator module for integral calculation according to the operating time, and summation is performed on a result of the integral calculation and the initial position $x_0$, to obtain a theoretical position of the hydraulic cylinder, that is, $$x_t = x_0 + \int_0^t v_t dt.$$

In addition, during the operation of the single-rod hydraulic cylinder 12, one pulse is sent to the count correction module 13 each time the magnetic induction mark 12-2 passes through the position transmitting unit 12-1. The count correction module 13 counts the number k of pulses. In combination with the spacing λ of the magnetic induction marks 12-2, the actual position of the hydraulic cylinder can be determined, that is, $x_a = k \cdot \lambda + x_0$.

In step 4, the theoretical position $x_t$ of the single-rod hydraulic cylinder 12 is compared with the actual position $x_a$ transmitted by the position transmitting unit, and specifically, one pulse is sent to the count correction module each time the magnetic induction mark passes through the position transmitting unit. If the total number of passes is k, the actual position $x_a$ of the hydraulic cylinder is determined according to the formula $x_a = k\lambda + x_0$, and the position deviation is calculated as $\Delta x = x_t - x_a$ and the correction coefficient is calculated as $\gamma = \Delta x/\lambda + 1$. In addition, a rotating speed control signal $n_{20}$ of the second power source 8 is corrected based on the correction coefficient γ. Calculation is performed to obtain a corrected rotating speed control signal $n_{21} = \gamma \cdot n_{20}$ and a set signal of the proportional directional valve 7 being $x_{v1}$. Then, an actual operating velocity $v_a$ of the single-rod hydraulic cylinder 12 is corrected.

In step 5, The velocity and displacement of the single-rod hydraulic cylinder 12 are corrected according to step 2 to step 4 each time the magnetic induction mark 12-2 passes through the position transmitting unit 12-1. After multiple iterations and corrections, the actual operating velocity $v_a$ and the position $x_a$ of the hydraulic cylinder reach an allowable error range with the set velocity $v_t$ and the position $x_t$, respectively. In addition, during the operation of the system, the pressures $p_s$, $p_A$, and $p_B$ and the temperature T are input into the calculation control module 15, to compensate for leakage of an output flow and oil compressibility of the second hydraulic pump 10. In this way, flow rates of the two chambers of the hydraulic cylinder can be obtained through calculation. Finally, position information of the single-rod hydraulic cylinder 12 is stored in the data storage module for the next initialization.

The calculation control module 15 calculates total input power, useful power, and power loss by using the following formulas:

Total input power:

$$P_s = Q_B(p_A - p_B) + Q_v p_s$$

Useful power:

$$P_{CY} = p_A Q_A - p_B Q_B$$

Power loss:

$$P_{LS} = Q_v \Delta p_v$$

where $\Delta p_v = p_A - p_B$.

The integrator module 14 calculates total input energy, useful energy, and throttling loss by using the following formulas:

Total input energy:

$$E_s = \int_0^t P_s dt$$

Useful energy:

$$E_{CY} = \int_0^t P_{CY} dt$$

Throttling loss:

$$E_{LS} = \int_0^t P_{LS} dt$$

System efficiency:

$$\eta = E_{CY}/E_s.$$

The data storage module 17 stores a rotating speed $n_1$ of the first power source 1, a displacement $V_1$ of the first hydraulic pump 2, a rotating speed $n_2$ of the second power source 8, a displacement $V_2$ of the second hydraulic pump 10, an opening $x_v$ of the proportional directional valve 7, a temperature signal T of the temperature sensor 5, an outlet pressure $p_s$ of the first hydraulic pump 2, a rodless-chamber pressure $p_A$ of the single-rod hydraulic cylinder 12, a rod-chamber pressure $p_B$ of the single-rod hydraulic cylinder 12, a rodless-chamber flow $Q_A$ of the hydraulic cylinder 12, a rod-chamber flow $Q_B$ of the hydraulic cylinder 12, the total input power $p_s$, useful power $P_2$, a velocity v of the single-rod hydraulic cylinder 12, the initial position $x_0$ of the single-rod hydraulic cylinder 12, the total input energy $E_s$, the useful energy $E_{CY}$, the throttling loss $E_{LS}$, and the system efficiency η.

The fault diagnosis module 19 can detect and preprocess a fault signal of the hydraulic system by using the system pressure, flow, power, energy consumption, system efficiency, and other information recorded by the data storage module 17. It is assumed that a system efficiency threshold is $\lambda_\eta$ and an energy consumption threshold is $\lambda_E$. If the system efficiency $\eta$ is less than $\lambda_\eta$, the hydraulic system will be shut down, and the pressure, flow, and power information are compared with curves in a healthy state to find out fault features. Based on an expert library, a fault can be accurately located after completing the identification of the fault features and fault reasons. If accumulated energy $E_2$ of the hydraulic cylinder driving system working is greater than $\lambda_E$, it can be theoretically considered that the hydraulic system has reached a fatigue state, and the system is to perform active shutdown for maintenance.

The process monitoring module 20 can display in real time data curves of the pressure, flow, position, system power, and system energy consumption in the data storage module 14, achieving visualization of hydraulic system parameters.

The communication protocol module 18 can upload the data in the data storage module 17 to the cloud memory 22. The cloud memory 22 has a complete automatic data backup mechanism, and can store operation data of the system in a full life cycle, laying the foundation for proactive operation and maintenance as well as optimization of system energy efficiency.

What is claimed is:

1. A velocity and position compound control system for a pump-valve dual-source driven hydraulic cylinder, comprising: a first power source, a first hydraulic pump, a second power source, a second hydraulic pump, a safety valve, a proportional directional valve, a pilot operated check valve, a single-rod hydraulic cylinder, a handle, a tank, a rotating speed sensor, a first pressure sensor, a second pressure sensor, a third pressure sensor, a temperature sensor, a position transmitting unit, magnetic induction marks, a count correction module, an integrator module, a calculation control module, a signal acquisition module, a data storage module, a cloud memory, a communication protocol module, a fault diagnosis module, and a process monitoring module, wherein a P port of the proportional directional valve is connected to the first pressure sensor, the temperature sensor, and an outlet port of the first hydraulic pump; an A port of the proportional directional valve is connected to a rodless chamber of the single-rod hydraulic cylinder and the second pressure sensor; a B port of the proportional directional valve is connected to a rod chamber of the single-rod hydraulic cylinder and the third pressure sensor; the inlet and outlet ports of the pilot operated check valve are connected to an outlet port of the proportional directional valve and the tank, respectively; and the inlet and outlet ports of the second hydraulic pump are connected to the rodless chamber and the rod chamber of the single-rod hydraulic cylinder, respectively, and the second power source is provided with the rotating speed sensor; and the signal acquisition module receives a rotating speed $n_2$ of the second power source, an oil temperature T, an outlet pressure $p_s$ of the first hydraulic pump, a rodless-chamber pressure $p_A$ of the single-rod hydraulic cylinder, a rod-chamber pressure pp of the single-rod hydraulic cylinder, and an output signal u of the handle, and an output port of the signal acquisition module is connected to the calculation control module and the data storage module; an output port of the calculation control module is connected to the integrator module and the data storage module, and transmits a control signal to the second power source, the proportional directional valve, the pilot operated check valve, and the first hydraulic pump; an output port of the integrator module is connected to the count correction module and the data storage module; the count correction module receives an output signal of the position transmitting unit, and an output signal of the count correction module is connected to the calculation control module; the data storage module is connected to the communication protocol module, the fault diagnosis module, and the process monitoring module; and the communication protocol module is connected to the cloud memory.

2. The velocity and position compound control system for a pump-valve dual-source driven hydraulic cylinder according to claim 1, wherein the magnetic induction marks have known spacing and are processed in an axial direction of a piston rod of the single-rod hydraulic cylinder as position monitoring points, wherein the magnetic induction marks are equidistantly arranged or non-equidistantly arranged.

3. The velocity and position compound control system for a pump-valve dual-source driven hydraulic cylinder according to claim 1, wherein the position transmitting unit is mounted on an end portion of a single-rod hydraulic cylinder, and the position transmitting unit is a magnetoresistive sensor, a hall sensor, or an eddy current sensor.

4. The velocity and position compound control system for a pump-valve dual-source driven hydraulic cylinder according to claim 1, wherein the calculation control module outputs the following parameters according to a signal processing module:

total input power: $P_s = Q_B(p_A - p_B) + Q_v p_s$, useful power: $P_{CY} = p_A Q_A - p_B Q_B$, and a power loss: $P_{LS} = Q_v \Delta p_v$;

wherein $Q_A$ represents a rodless-chamber flow rate of the hydraulic cylinder, $Q_B$ represents a rod-chamber flow rate of the hydraulic cylinder, $Q_v$ represents a flow rate of the proportional directional valve, $p_s$ represents the outlet pressure of the first hydraulic pump, and $\Delta p_v = p_A - p_B$.

5. The velocity and position compound control system for a pump-valve dual-source driven hydraulic cylinder according to claim 4, wherein the integrator module outputs the following parameters:

a theoretical position of the single-rod hydraulic cylinder:

$$x_t = x_0 + \int_0^t v_t dt,$$

total input energy:

$$E_s = \int_0^t P_s dt,$$

useful energy:

$$E_{CY} = \int_0^t P_{CY} dt,$$

a throttling loss:

$$E_{LS} = \int_0^T P_{LS}dt,$$

and system efficiency: $\eta = E_{CY}/E_s$;

wherein $x_0$ is an initial position, and $v_t$ is a set velocity of a single-rod hydraulic cylinder.

6. The velocity and position compound control system for a pump-valve dual-source driven hydraulic cylinder according to claim 5, wherein one pulse is sent to the count correction module each time the magnetic induction mark passes through the position transmitting unit; and if a total number of passes is k, an actual position $x_a$ of the single-rod hydraulic cylinder is determined according to a formula $x_a = k\lambda + x_0$, a position deviation is calculated as $\Delta x = x_t - x_a$, a distance between two position detection points is 2, a velocity correction coefficient $\gamma$ is calculated according to a formula $\gamma = \Delta x/\lambda + 1$, and $\gamma$ is transmitted to the calculation control module.

7. The velocity and position compound control system for a pump-valve dual-source driven hydraulic cylinder according to claim 1, wherein the data storage module is configured to store operation data of a hydraulic cylinder drive system in a full life cycle;
 the process monitoring module displays a dynamic curve of a parameter in the data storage module;
 the communication protocol module is the Ethernet, an industrial Internet, or Bluetooth, transmits data from the data storage module to the cloud memory, and receives data information stored in the cloud memory; and
 the fault diagnosis module performs fault analysis and proactive maintenance on a hydraulic system according to system parameters received by the data storage module.

* * * * *